US011189270B2

(12) United States Patent
Takahashi et al.

(10) Patent No.: US 11,189,270 B2
(45) Date of Patent: Nov. 30, 2021

(54) METHOD OF CONTROLLING DIALOGUE SYSTEM, DIALOGUE SYSTEM, AND DATA STORAGE MEDIUM

(71) Applicant: Hitachi, Ltd., Tokyo (JP)

(72) Inventors: Toshimitsu Takahashi, Tokyo (JP); Yoshitaka Hiramatsu, Tokyo (JP); Kazumasa Tokuhashi, Tokyo (JP); Tasuku Soga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 118 days.

(21) Appl. No.: 16/360,049

(22) Filed: Mar. 21, 2019

(65) Prior Publication Data

US 2019/0392822 A1 Dec. 26, 2019

(30) Foreign Application Priority Data

Jun. 26, 2018 (JP) .............................. JP2018-120890

(51) Int. Cl.
*G10L 15/18* (2013.01)
*G06F 3/0488* (2013.01)
(Continued)

(52) U.S. Cl.
CPC ...... *G10L 15/1815* (2013.01); *G06F 3/04883* (2013.01); *G06F 3/167* (2013.01); *G10L 15/22* (2013.01)

(58) Field of Classification Search
CPC . G10L 15/1815; G10L 15/22; G06F 3/04883; G06F 3/167
See application file for complete search history.

(56) References Cited

U.S. PATENT DOCUMENTS

| 5,421,728 A | * | 6/1995 | Milden | .................. | G01S 7/021 |
| | | | | | 342/169 |
| 7,747,601 B2 | * | 6/2010 | Cooper | .................. | G06N 20/00 |
| | | | | | 707/708 |

(Continued)

FOREIGN PATENT DOCUMENTS

| JP | 11-288342 A | 10/1999 |
| JP | 2006-048628 A | 2/2006 |

(Continued)

OTHER PUBLICATIONS

Extended European Search Report received in corresponding European Application No. 19164580.3 dated Oct. 29, 2019.

(Continued)

*Primary Examiner* — Fariba Sirjani
(74) *Attorney, Agent, or Firm* — Mattingly & Malur, PC

(57) ABSTRACT

A dialogue system including a processor, a memory, an audio input apparatus, an audio output apparatus, a touch input apparatus, and a display unit. The processor receives an input from the voice or a touch input apparatus, analyzes the content of the input, and selects a scenario corresponding to the input data from preset scenario information. The processor generates the output data specified in the scenario, calculates the priority of the input data, and determines the presence or absence of the scenario being prepared for the output data. When there is the scenario under generating the output data, the processor changes the output method of the scenario to be executed based on the priority.

11 Claims, 12 Drawing Sheets

(51) Int. Cl.
*G06F 3/16* (2006.01)
*G10L 15/22* (2006.01)

(56) References Cited

U.S. PATENT DOCUMENTS

| | | | | |
|---|---|---|---|---|
| 10,642,873 | B2* | 5/2020 | Blackford | G06F 16/3344 |
| 10,769,385 | B2* | 9/2020 | Evermann | G06F 40/35 |
| 2005/0149558 | A1* | 7/2005 | Zhuk | G06F 8/10 |
| 2005/0288934 | A1 | 12/2005 | Omi | |
| 2006/0095268 | A1* | 5/2006 | Yano | G10L 15/22 |
| | | | | 704/275 |
| 2008/0015864 | A1* | 1/2008 | Ross, I | G10L 15/1822 |
| | | | | 704/275 |
| 2008/0287868 | A1* | 11/2008 | Naber | A61B 17/12 |
| | | | | 604/103.02 |
| 2009/0077047 | A1* | 3/2009 | Cooper | G06F 16/3344 |
| 2010/0049517 | A1* | 2/2010 | Huang | H04M 3/4936 |
| | | | | 704/251 |
| 2013/0253926 | A1* | 9/2013 | Takahashi | G10L 13/04 |
| | | | | 704/235 |
| 2014/0074483 | A1* | 3/2014 | Os | G06F 3/167 |
| | | | | 704/275 |
| 2014/0136213 | A1 | 5/2014 | Kim et al. | |
| 2016/0085854 | A1* | 3/2016 | Blackford | G06F 16/3344 |
| | | | | 707/738 |
| 2018/0074785 | A1 | 3/2018 | Ohmura | |
| 2019/0179890 | A1* | 6/2019 | Evermann | G06F 40/35 |

FOREIGN PATENT DOCUMENTS

| | | |
|---|---|---|
| JP | 2017-010294 A | 1/2017 |
| WO | 2015/196063 A1 | 12/2015 |
| WO | 2016/157662 A1 | 10/2016 |

OTHER PUBLICATIONS

Japanese Office Action received in corresponding Japanese Application No. 2018-120890 dated Jun. 1, 2021.

* cited by examiner

| TIME /251 | USER COUNT /252 | AGE /253 | GENDER /254 | STATUS /255 | ENVIRONMENTAL SOUND /256 | LINE-OF-SIGHT DIRECTION /257 | MOVEMENT OF MOUTH /258 | MOVEMENT OF HAND /259 |
|---|---|---|---|---|---|---|---|---|
| 2010/01/02 12:34:56 | 1 | 30S | FEMALE | GENERAL USER | NOISY | FRONTWARD | MOVING | HOLDING HAND UP TOWARD SCREEN |
| ... | ... | ... | ... | ... | ... | ... | ... | ... |
| 2010/01/02 14:44:44 | 2 | TEENS 40S | MALE MALE | GENERAL USER STAFF MEMBER | EXTREMELY NOISY | FRONTWARD DOWNWARD | STATIONARY MOVING | HAND UNDETECTED HOLDING HAND DOWN |
| ... | ... | ... | ... | ... | ... | ... | ... | ... |

250 USAGE SITUATION HISTORY DB

Fig. 11

260 SCENARIO TABLE

| # | DIALOGUE LIST |
|---|---|
| 1 | QUESTION ("HOW MAY I HELP YOU ?",a ); CASE (a, RESTAURANTS,2, SHOPS,3) |
| 2 | QUESTION (DINING INFORMATION, "WHAT KIND OF FOOD WOULD YOU LIKE TO HAVE ?",b ); CASE (b, JAPANESE FOODS ,4, WESTERN-STYLE FOODS, 4, CHINESE FOODS, 4, OTHERS,4) |
| 3 | QUESTION (PRODUCT INFORMATION, "WHAT ARE YOU LOOKING FOR ?",c ); CASE (c, CLOTHES, 4, MISCELLANEOUS GOODS, 4, SHOES,4) |
| 4 | QUESTION (SHOP SELECTION, "WHICH SHOP WOULD YOU LIKE TO KNOW IN DETAIL ABOUT ? ",d); CASE (d, SEARCH RESULTS,5) |
| 5 | ANSWER (SEARCH RESULTS, "DISPLAYED SHOPS ARE RECOMMENDED" ); OUTPUT,GOTO(1) |
| ⋮ | ⋮ |
| 10 | ANSWER (RESTROOMS, "CHECK THE MAP TO FIND RESTROOM, PLEASE"); OUTPUT,GOTO(,1) |
| ⋮ | ⋮ |

METHOD OF CONTROLLING DIALOGUE SYSTEM, DIALOGUE SYSTEM, AND DATA STORAGE MEDIUM

CLAIM OF PRIORITY

The present application claims priority from Japanese patent application JP 2018-120890 filed on Jun. 26, 2018, the content of which is hereby incorporated by reference into this application.

BACKGROUND

This invention relates to a dialogue system using audio and a touch panel.

In recent years, speech recognition technology has come into wide use with the advance of machine learning. It is becoming more difficult to provide, by existing staff alone, a diversity of interpersonal services including facility information guidance at airports and stations, which requires services to be provided in various languages, and over-the-counter services at financial institutions, local governments, and the like, which handle a plurality of complicate services. In order to assist with such service operations ever increasing in sophistication, practical application of a dialogue system in the form of a robot, an audio assistant, and other forms, is being advanced.

As the dialogue system, there is known an apparatus including a plurality of input apparatus for an audio input, a touch input, a pen input, and other such input (see JP 2017-010294 A, JP 11-288342 A, and JP 2006-048628 A). For example, in JP 2017-010294 A, there is disclosed a technology for outputting pseudo-execution results based on different input operations performed within a fixed time period as respective selection items to allow a user to select one of the selection items.

In JP 11-288342 A, there is disclosed an apparatus configured to interpret a user's intention from a plurality of modalities of inputs, present a result of the interpretation to the user, and select a result requested by the user. In JP 2006-048628 A, there is disclosed an apparatus configured to receive input information from at least two kinds of input means, control recognition processing for an input from the other input means based on information on the number of inputs from one input means, and output a recognition result obtained by performing the recognition under the above-mentioned control.

SUMMARY

In the dialogue system including a plurality of input apparatus, a plurality of inputs can be received within a fixed period, and when the intentions of a plurality of inputs are different, in JP 2017-010294 A and JP 11-288342 A described above, options corresponding to a plurality of inputs are presented to allow the user to select one of the options. However, in the above-mentioned related arts, the user is required to further input such an option even after inputting an answer or an instruction, which raises a problem in that the operation becomes complicated. In addition, JP 2006-048628 A described above has a problem in that it is difficult to perform the recognition processing for the input from the other input means when there is no information on the number of inputs.

Therefore, this invention has been made in view of the above-mentioned problems, and has an object to generate an output corresponding to a user's intention while preventing an operation from becoming complicated when a plurality of inputs are received within a fixed period.

An aspect of this disclosure is a method of controlling a dialogue system including a processor, a memory, an audio input apparatus, an audio output apparatus, and a display unit, the method comprising: generating, by the processor, input data by receiving audio input from the audio input apparatus and analyzing content of the audio input; generating, by the processor, output data designated by a scenario corresponding to the input data, the scenario being selected from scenario information set in advance; calculating, by the processor, a priority of the input data; determining, by the processor, presence or absence of a scenario having the output data being generated; and changing, by the processor, an output method for a scenario to be executed based on the priority when the scenario having the output data being generated is present.

Therefore, according to one embodiment of this invention, it is possible to generate the output corresponding to the user's intention while preventing the operation from becoming complicated when the plurality of inputs are received within the fixed period.

BRIEF DESCRIPTION OF THE DRAWINGS

FIG. 11 is a table for showing an example of data output by the usage situation analysis module and stored in the usage situation history database according to the embodiment of this invention.

FIG. 12 is a table for showing an example of the scenario table included in the conversation database according to the embodiment of this invention.

DETAILED DESCRIPTION OF THE PREFERRED EMBODIMENTS

An embodiment of this invention is described below with reference to the accompanying drawings.

<System Configuration>

Figure 1:
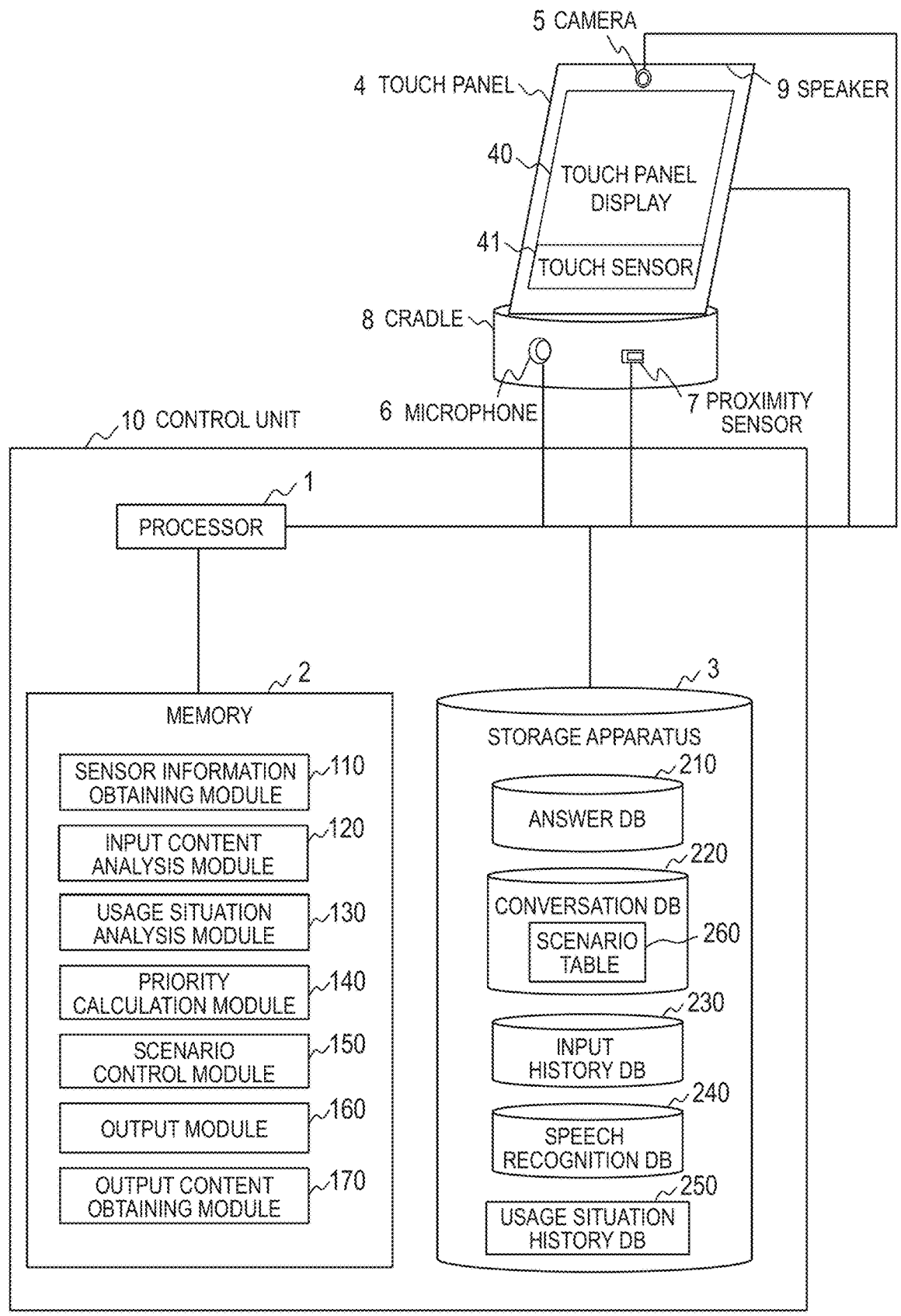
FIG. 1 is a block diagram for illustrating an example of a configuration of a dialogue system according to an embodiment of this invention.

FIG. 1 is a block diagram for illustrating an example of a configuration of a dialogue system according to an embodiment of this invention. A description is given of an example in which the dialogue system according to this embodiment is installed in an airport, a station, a shopping mall, or other such public facility, and encourages a user to perform an input by voice or touch to provide the user with guidance on the facility.

The dialogue system includes a touch panel 4 mounted at such a position as to face a user, a cradle 8 configured to support the touch panel 4, a microphone 6 mounted to the cradle 8, a speaker 9 and a camera 5, which are mounted to the touch panel 4, a proximity sensor 7 mounted to the cradle 8, and a control unit 10 configured to control each apparatus.

The control unit 10 is formed of a computer including a processor 1, a memory 2, and a storage apparatus 3.

FIG. 1 is merely an example of the configuration of the dialogue system according to one embodiment of this invention, and this invention is not limited thereto. For example, the cradle 8 and the control unit 10 may be formed integrally with each other, or the cradle 8 may be mounted with a camera and a speaker. The camera 5 and the proximity sensor 7 each function as a sensor configured to detect a situation of the user.

A sensor information obtaining module 110, an input content analysis module (input data generation unit) 120, a usage situation analysis module 130, a priority calculation module 140, a scenario control module 150, an output content obtaining module 170, and an output module 160 are each loaded into the memory 2 as a program to be executed by the processor 1.

The processor 1 performs processing based on a program of each of the functional modules, to thereby operate as the functional module configured to provide a predetermined function. For example, the processor 1 performs processing based on a sensor information obtaining program, to thereby function as the sensor information obtaining module 110. The same applies to the other programs. The processor 1 further operates as the functional module configured to provide the function of each of a plurality of pieces of processing executed by each program. A computer and a computer system represent an apparatus and a system, respectively, including those functional modules.

Information including programs and tables for implementing the respective functions of the control unit 10 can be stored in: a storage device, for example, the storage apparatus 3, a nonvolatile semiconductor memory, a hard disk drive, or a solid state drive (SSD); or a computer-readable non-transitory data storage medium, for example, an IC card, an SD card, or a DVD.

The storage apparatus 3 stores data to be used by each program. In the example illustrated in FIG. 1, the storage apparatus 3 stores an answer database 210 for storing in advance guidance information including information on a shop in the facility, a conversation database 220 including a scenario table 260 and other data, an input history database 230 for storing a user's input information, a speech recognition database 240 to be used for speech recognition, and a usage situation history database 250 for storing an analysis result for a usage situation. The respective pieces of data are described later in detail.

The touch panel 4 includes a touch panel display 40 and a touch sensor 41. The touch panel display 40 functions as a display unit configured to display information output by the control unit 10. The touch sensor 41 detects a touch input performed on the touch panel 4, and transmits the touch position information to the control unit 10. The microphone 6 obtains the user's speech, noise in an installation environment, or other such sound. The speaker 9 outputs audio signal received from the control unit 10. The camera 5 takes an image of the user. The proximity sensor 7 detects presence or absence of the user.

<Outlines of Functions>

Figure 2:
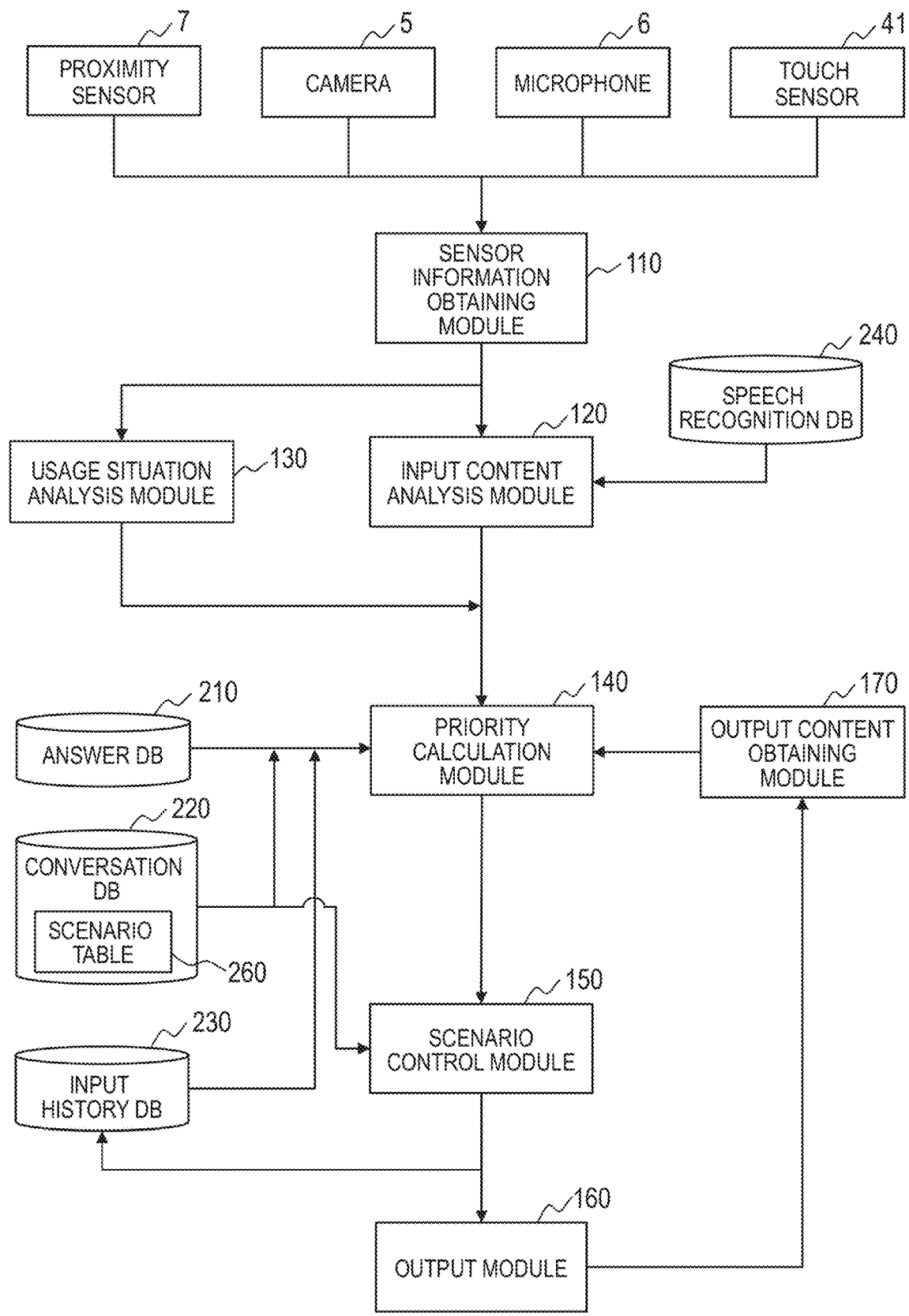
FIG. 2 is a block diagram for illustrating an example of the functions of the dialogue system according to the embodiment of this invention.

Next, a description is given of an outline of each functional module. FIG. 2 is a block diagram for illustrating an example of the functions of the dialogue system.

The sensor information obtaining module 110 receives outputs (sensor information) from the camera 5, the microphone 6, the proximity sensor 7, and the touch sensor 41, and outputs the received outputs to the input content analysis module 120 and the usage situation analysis module 130.

The input content analysis module 120 appropriately separates the user's speech from surrounding environmental sound (noise) based on audio information input to the microphone 6 to obtain only the user's speech data as input data. The input content analysis module 120 then refers to the speech recognition database 240 to execute speech recognition and output text corresponding to the speech. In regard to speech recognition, for example, a hidden Markov model or other such well-known or publicly-known technology may be used. The speech recognition database 240 stores in advance information required for speech recognition, for example, an acoustic model, a dictionary, and a language model.

In addition, when receiving a touch input from the touch sensor 41, the input content analysis module 120 generates text or a value corresponding to the user's touch input in accordance with a scenario currently being executed.

The input content analysis module 120 outputs the text being a result of the speech recognition and the text or the value corresponding to the touch input to the priority calculation module 140 as the input data.

The usage situation analysis module 130 detects noise (for example, sound pressure level) of the environment in which the microphone 6 is installed, and outputs the noise to the priority calculation module 140 as noise information. The usage situation analysis module 130 also recognizes the image of the user taken by the camera 5, and calculates attributes and a situation of the user. In regard to the image recognition performed by the usage situation analysis module 130, for example, a well-known or publicly-known image recognition technology is used to identify, for example, an age, a gender, and a status of a user as the attributes of the user. The usage situation analysis module 130 further detects the number of users and positions of the users from the taken image of the user.

In addition, the usage situation analysis module 130 obtains the user's line of sight, a direction of the user's face, a movement of the user's mouth, and a movement of the user's hand, and sets those pieces of information as information indicating the situation of the user. The usage situation analysis module 130 outputs the recognized attributes and situation of the user to the priority calculation module 140.

Meanwhile, the usage situation analysis module 130 detects appearance and leaving (end of use) of the user from the output from the proximity sensor 7, and when a new user appears, may notify the scenario control module 150 to start processing.

The priority calculation module 140 receives the input data corresponding to the user's speech and the touch input from the input content analysis module 120, and receives the presence or absence, the attributes, and the situation of the user from the result of the recognition performed by the usage situation analysis module 130.

The priority calculation module 140 calculates the priority of each piece of input data based on the kind of input data (audio input or touch input), content of the input data, past input data accumulated in the input history database 230, the situation of the user output by the usage situation analysis module 130, and a degree of relevance between the input data and the scenario currently being executed. The calculation of the priority is described later. The priority calculation module 140 outputs the calculated priority of each piece of input data to the scenario control module 150.

The scenario control module 150 selects a scenario to be executed from the scenario table 260 based on the priority of each piece of input data, which is received from the priority calculation module 140, and causes the output module 160 to execute the selected scenario.

The output module 160 generates a screen output, an audio output, or other such output data corresponding to the input data in accordance with the scenario output by the scenario control module 150, and outputs the output data to the touch panel 4 and the speaker 9. The output module 160 also outputs the output data to the output content obtaining module 170. The output content obtaining module 170 feeds back the generated output data to the priority calculation module 140.

When receiving a plurality of pieces of input data within a fixed period, the scenario control module 150 compares the priorities of the respective pieces of input data with one another to change the execution order of the scenarios in descending order of the priority. In another case, the scenario control module 150 changes an order of outputs or a ratio of outputs (for example, a ratio of output sizes on the touch panel display 40, a ratio of durations of appearance on the touch panel display 40, or a ratio of durations of outputs from the speaker 9) of results of executing the scenarios in descending order of the priority.

The scenario control module 150 notifies the output module 160 of the output results based on the scenarios whose execution order (or execution ratio) has been changed. When a plurality of pieces of input data are not received within the fixed period, the scenario control module 150 selects an output scenario corresponding to the input data from the scenario table 260, and causes the output module 160 to execute the selected output scenario. The output scenario corresponding to the input data can be obtained by searching the scenario table 260 through use of well-known or publicly-known technology as, for example, a result of searching the scenario table 260 with a word included in the input data or a result of searching for a word having a high similarity degree between a word included in the input data and a word included in the scenario table 260.

In this case, the scenario control module 150 sets, as the fixed period, a period after the input data is received until the output module 160 is caused to execute the scenario corresponding to the input data.

For example, when a piece of data is input from the touch sensor 41 and another piece of data is input from the microphone 6 within the fixed period, the scenario control module 150 causes the output module 160 to execute the scenario corresponding to the piece of input data having the higher priority of the two pieces of input data and to delay or discard the execution of the scenario corresponding to the piece of input data having the lower priority.

The selection of display or a speech to be output by the output module 160 may be appropriately changed by the scenario control module 150 depending on, for example, the magnitude of noise. In this embodiment, the output data can be output simultaneously from both the touch panel display 40 and the speaker 9.

In addition, the scenario control module 150 stores the input data in the input history database 230.

As described above, in the dialogue system according to this embodiment, it is possible to provide an output corresponding to a user's intention while preventing an operation from becoming complicated when a plurality of inputs are received within a fixed period.

<Details of Data>

Now, a description is given of data to be used by the control unit 10. FIG. 11 is a table for showing an example of data output by the usage situation analysis module 130 and stored in the usage situation history database 250.

The usage situation history database 250 includes, in each entry, an input time 251 and analysis results for respective usage situation parameters (including a user count, a gender, a status, an environmental sound, a line-of-sight direction of each user, a movement of a mouth of each user, and a movement of a hand of each user) including a user count 252, an age 253, a gender 254, a status 255, an environmental sound 256, a line-of-sight direction 257, a movement of mouth 258, and a movement of hand 259.

Each of results of the analysis performed by the usage situation analysis module 130 is recorded as the analysis result for each of the usage situation parameters.

A predetermined weight is set in advance for the analysis result for each of the usage situation parameters in order to use the analysis result for the calculation of the priority to be performed by the priority calculation module 140. For example, when a status parameter to be analyzed is classified so as to have values of a general user, a staff member, a maintenance person, and another (classification unknown), a weight that contributes to the calculation of the priority is set to the highest priority of 1.0 for the input of the staff member, to 0.5 for the input of the general user, to 0.3 for the input of another (classification unknown), and to 0.1 for the input of the maintenance person.

The analysis results for the status parameters and the weights set for the respective analysis results are merely examples, and another analysis result or another weight may be set.

FIG. 12 is a table for showing an example of the scenario table 260 included in the conversation database 220. Each row of the scenario table 260 is formed of a list number ("#" in FIG. 12) 261 and a dialogue list 262.

The dialogue list 262 is a list of dialogue lines to be presented to the user by the dialogue system, and one or more dialogue lines separated by semicolons are written in FIG. 12. Output information, input information, and the list number of the next dialogue are set to the dialogue list 262.

As output information from the dialogue list 262, "QUESTION" of the list number 261 of "1" means an inquiry for a user, and the control unit 10 outputs content of a dialogue representing "How may I help you?" in the form of display or a speech. Then, "restaurants" and "shops" are set in "CASE" as options for inquiry information to be output together with the list numbers 261 of scenarios to be executed subsequently.

For example, when the user selects "restaurants" by a touch input, the next processing uses a dialogue list having "2" as the list number 261, and a value indicating "restaurants" and obtained through a touch input is stored as a variable "a".

In "QUESTION" of the list number 261 of "2", an inquiry is made as to which one to select from among subcategories relating to meals, namely, "Japanese foods", "Western-style foods", "Chinese foods", and "Others". In either selection, the control unit 10 searches the answer database 210 with an answer (selection result) corresponding to the inquiry being used as an input, and makes an inquiry by "Which shop would you like to know in detail about?" being "QUESTION" of the list number 261 of "4" for further displaying subcategories corresponding to the selection result. The subsequent processing is indicated by the list number 261 of "5", and hence the control unit 10 outputs candidates for shop guidance information, which are search results corresponding to the answer, as "ANSWER".

In the example shown in FIG. 12, "GOTO(1)" is used to return to the list having "1" as the list number 261 after the search results are output ("OUTPUT") in the list having "5" as the list number 261. However, this invention is not limited thereto. For example, the dialogue system may ask the user to select a desired shop from the output candidates to provide more detailed information or check for available tables or seats.

The dialogue list 262 indicates an example in which a location of a restroom is output to the touch panel display 40 by "ANSWER" of the list number 261 of "10". In this case, the scenario control module 150 may obtain, for example, map data on the inside of the facility, which is stored in the answer database 210 in advance, to output the map data as the guidance information.

Although not shown, the answer database 210 can be formed of, for example, an identifier of a shop, its category, and detailed information on the shop including business hours. Although not shown, the input history database 230 can store, for example, a date, a time, and input information.

<Details of Processing>

Figure 3:
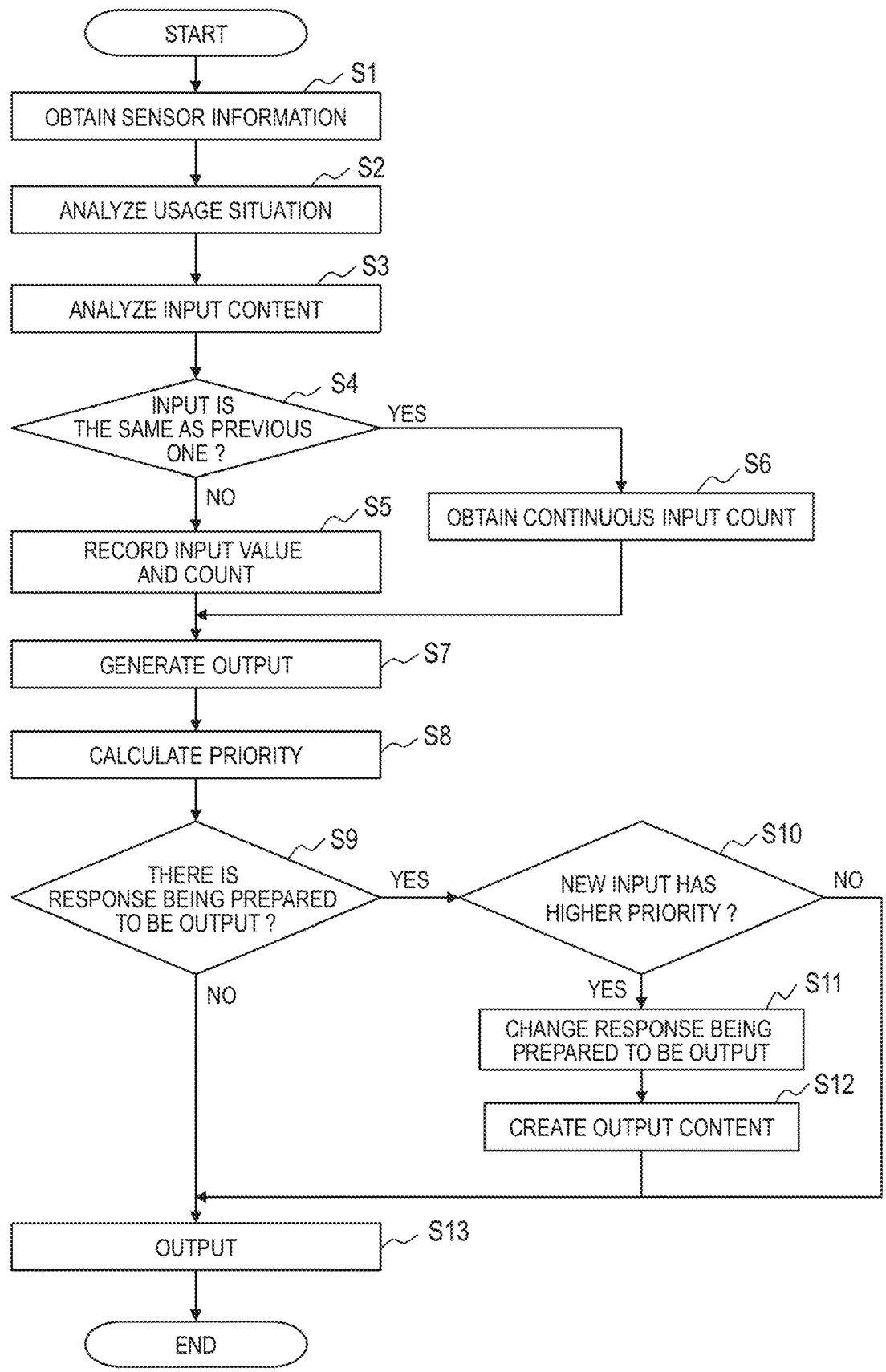
FIG. 3 is a flow chart for illustrating an example of dialogue processing to be performed by the control unit according to the embodiment of this invention.

FIG. 3 is a flow chart for illustrating an example of dialogue processing to be performed by the control unit 10. The dialogue processing is executed when the sensor information obtaining module 110 of the control unit 10 receives a touch input or an audio input.

First, in Step S1, the control unit 10 obtains, as the sensor information, an audio input received from the microphone 6 or a touch input received from the touch sensor 41, information on an image received from the camera 5, and proximity information received from the proximity sensor 7.

In Step S2, the control unit 10 causes the usage situation analysis module 130 to recognize the information on the image of the user taken by the camera 5, identifies the attributes (age, gender, and status) of the user, and detects the number of users and the positions of the users. As described above, the usage situation analysis module 130 recognizes the user's line of sight, the direction of the user's face, the movement of the user's mouth, and the movement of the user's hand, and sets those pieces of information as the information indicating the situation of the user. The usage situation analysis module 130 also detects the appearance and the leaving (end of use) of the user from the output from the proximity sensor 7. The usage situation analysis module 130 further detects a level of noise in an environment in which the cradle 8 is installed based on audio data obtained from the microphone 6.

In Step S3, the control unit 10 causes the input content analysis module 120 to perform speech recognition on the audio input to generate text corresponding to the user's speech as the input data. The input content analysis module 120 also generates input data (text or a value indicating a touched position, for example) corresponding to a scenario in the scenario table 260 in response to the touch input.

In Step S4, the control unit 10 refers to the input history database 230 to determine whether or not the current piece of input data is the same as the previous piece of input data. When the current piece of input data is the same as the previous piece of input data, the procedure advances to Step S6, and otherwise advances to Step S5.

In Step S5, the control unit 10 registers the value of the current piece of input data in the input history database 230, and sets a count to 1. Meanwhile, in Step S6, the control unit 10 obtains a continuous input count of the current piece of input data from the input history database 230, increments the continuous input count in the input history database 230, and then registers the continuous input count.

Subsequently, in Step S7, the control unit 10 causes the scenario control module 150 to select the scenario corresponding to the input data from the scenario table 260 to generate screen display content, audio reproduction content, and other such output content.

Subsequently, in Step S8, the control unit 10 calculates a priority P of the current piece of input data by the following expression.

$$\text{Priority} P = \Sigma \alpha_i \beta_i \gamma_i \times \delta \times \varepsilon \qquad (1)$$

In the above-mentioned expression:

$\alpha_i$ represents a weight for the priority of each usage situation parameter;

$\beta_i$ represents a weight corresponding to the kind of input (audio input or touch input);

$\gamma_i$ represents a value corresponding to the usage situation of each usage situation parameter;

$\delta$ represents a degree of relevance between data that has been output and output content being generated; and $\varepsilon$ represents a continuous count of the same piece of input data.

The value of the weight is set in advance. As the degree of relevance between the output content that has been output (output result for the previous piece of input data) and the current piece of input data, a similarity degree between words included in the data that has been output and the current piece of input data can be used, and may be calculated through use of, for example, Word2vec, a cosine similarity, or other such well-known method.

Subsequently, in Step S9, the control unit 10 determines whether or not there is a scenario having the output data being generated (prepared) by the output module 160. The procedure advances to Step S10 when there is a scenario having the output data being generated, and advances to Step S13 when there is no scenario having the output data being generated.

In Step S10, the priority of the current piece of input data calculated in Step S8 is compared with the priority of the input data being prepared to be output (assumed to be the previous piece of input data) to determine whether or not the priority of the current piece of input data is higher than the priority of the previous piece of input data. When the priority of the current piece of input data is higher, the procedure advances to Step S11, and otherwise advances to Step S13.

In Step S11, the control unit 10 changes an output method for the scenario being currently prepared to be output, and generates a scenario output in consideration of the output data for the scenario corresponding to the current piece of input data. This processing is performed by executing predetermined processing, for example, changing the execution order of the scenario for which the output data is to be generated, changing the size and position of the output data to be output to the touch panel display 40 depending on the priority, or discarding the output data for the previous piece of input data.

In other words, the control unit 10 determines whether to output only the output data corresponding to the current piece of input data or to output both the output data corresponding to the current piece of input data and the output data corresponding to the previous piece of input data with the sizes corresponding to the priorities at the positions corresponding to the priorities.

In Step S12, the control unit 10 causes the scenario control module 150 to generate scenario data to be output from the output module 160 based on the output content determined in Step S11. In Step S13, the control unit 10 causes the output module 160 to output the output data for the scenario generated by the scenario control module 150 in Step S7 or Step S12 described above.

According to the above-mentioned processing, when any inputs occur in order within a fixed period, the priorities of the current (most recent) piece of input data and the previous (immediately preceding) piece of input data are compared with each other, to thereby allow the control unit 10 to automatically determine which piece of output data corresponding to which piece of input data is to be prioritized.

This can prevent, unlike the related art, the user from further inputting another option even after inputting an answer or an instruction. Therefore, it is possible to provide a dialogue system configured to generate outputs corresponding to the user's intention while preventing an operation from becoming complicated when a plurality of inputs are received within a fixed period.

Figure 4:
FIG. 4 is a diagram for illustrating an example of a guidance screen 300 to be displayed on the touch panel display according to the embodiment of this invention.

FIG. 4 is a diagram for illustrating an example of a guidance screen 300 to be displayed on the touch panel display 40, and indicates a case of changing the order of the output data. On the assumption that an avatar 600 on the bottom left provides guidance, the guidance screen 300 uses both the touch input and the audio input, and an audio input result is displayed in an input field 700 of the guidance screen 300. In the example illustrated in FIG. 4, on the guidance screen 300, a speech of the avatar 600 and data input by the user are displayed on the left side and on the right side, respectively, while being scrolled up from the bottom of the screen.

First, the control unit 10 of the dialogue system makes an inquiry for a user who has arrived in front of the touch panel 4 based on the scenario table 260 to output "How may I help you?" (401) on the touch panel display 40. At this time, "How may I help you?" may be output from the speaker 9 in the form of audio, or both the screen and audio representing "How may I help you?" may be simultaneously output. In the example of FIG. 4, the user subsequently responds "I want to have a meal" (501) as an audio input.

The control unit 10 refers to the scenario table 260 to output the sentence "What kind of food would you like to have?" (402) and the options of "Japanese foods" to "Others" to the touch panel display 40 (or the speaker 9).

In response to this, the user touches "Western-style foods" (502) on the touch panel 4, and then inputs "Actually, I want to go to the restroom first" (503) by voice. The output data for the previous piece of input data being "Western-style foods" is being prepared, and hence the scenario control module 150 of the control unit 10 compares the priority of the previous piece of input data being "Western-style foods" and the priority of the current (most recent) the data being "Actually, I want to go to the restroom first" with each other.

When determining that the priority of the current piece of input data is higher than the priority of the immediately preceding piece of input data, the control unit 10 refers to the answer database 210 to output a map indicating how to get to the restroom from the current position to the touch panel display 40 as illustrated in FIG. 4 (403). In this manner, when a plurality of pieces of input data are received within a fixed period, the control unit 10 can change the execution order of the scenario depending on the priority of the input data.

When detecting the leaving of the user as the usage situation of the user based on the output from the proximity sensor 7 or the camera 5 after outputting the map to the restroom to the touch panel display 40, the control unit 10 can discard the output data and the data being prepared to be output. Meanwhile, when continuously detecting the presence of the user based on the output from the proximity sensor 7 or the camera 5 after outputting the map to the restroom to the touch panel 4, the control unit 10 can return to the scenario table 260 to execute the scenario corresponding to the previous piece of input data to output the output data.

Figure 5:
FIG. 5 is a diagram for illustrating an example of the guidance screen to be displayed on the touch panel display according to the embodiment of this invention.

FIG. 5 is a diagram for illustrating an example of the guidance screen 300 to be displayed on the touch panel display 40, and indicates an exemplary case in which the user is continuously detected when the execution order of the scenario illustrated in FIG. 4 is changed. On the guidance screen 300, after the map to the restroom (403) is displayed, shop options 404 are displayed as a response to the immediately preceding piece of input data being "Western-style foods" (502).

In this case, the control unit 10 causes the scenario control module 150 to replace the scenario corresponding to the current piece of input data by the scenario corresponding to the previous piece of input data so as to be executed by the output module 160, to thereby change the order of the output data.

Then, the user performs a touch input from the shop options 404, which allows the control unit 10 to search the answer database 210 for corresponding shop information and display the shop information on the touch panel 4.

Figure 6:
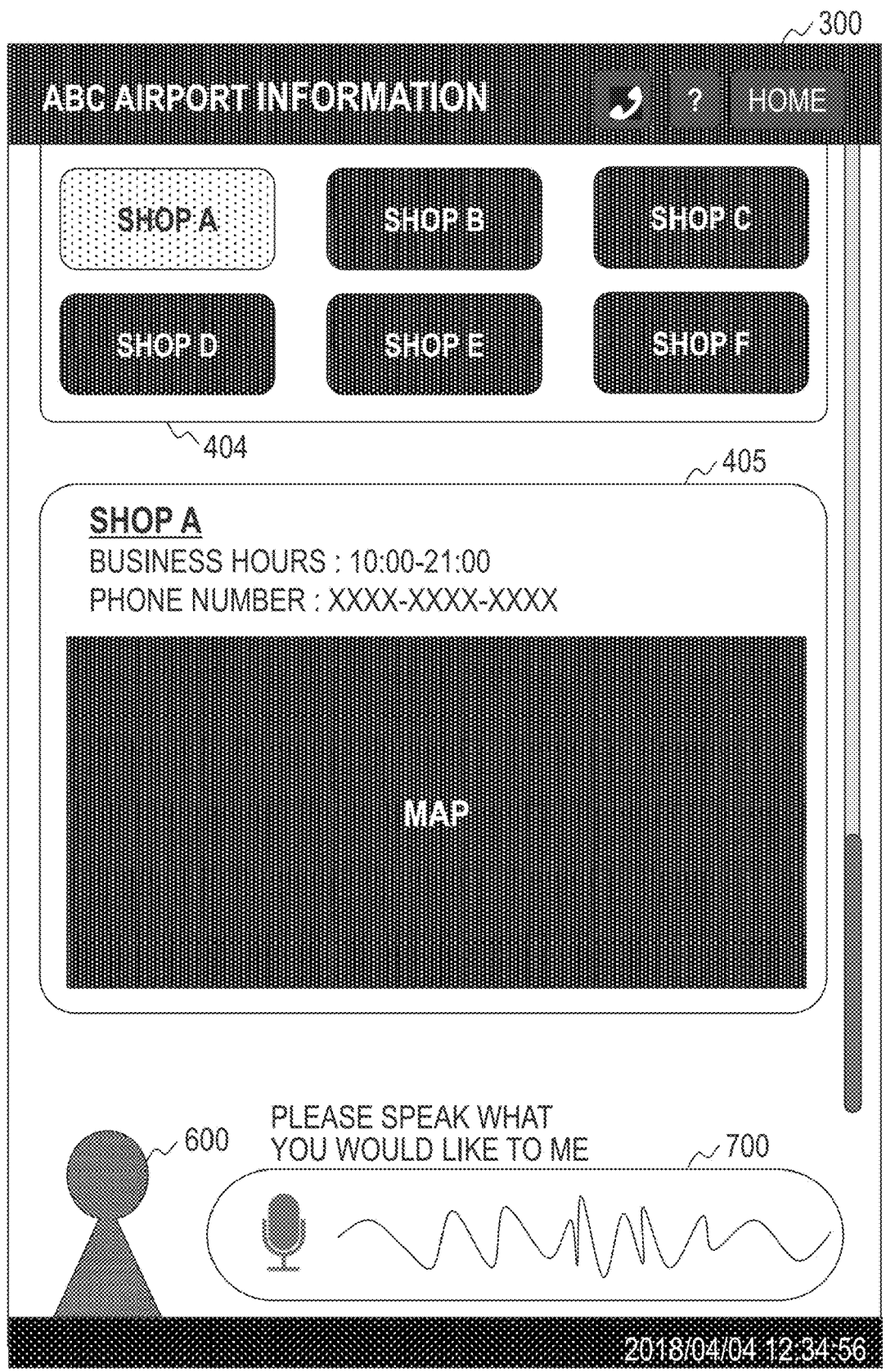
FIG. 6 is an illustration of another example of the guidance screen to be displayed on the touch panel display according to the embodiment of this invention.

FIG. 6 is an illustration of an example of a case in which the user has selected "Shop A" as a touch input from the shop options 404 illustrated in FIG. 5. In the example of FIG. 6, detailed shop information 405 relating to "Shop A" is output to the touch panel display 40.

Figure 7:
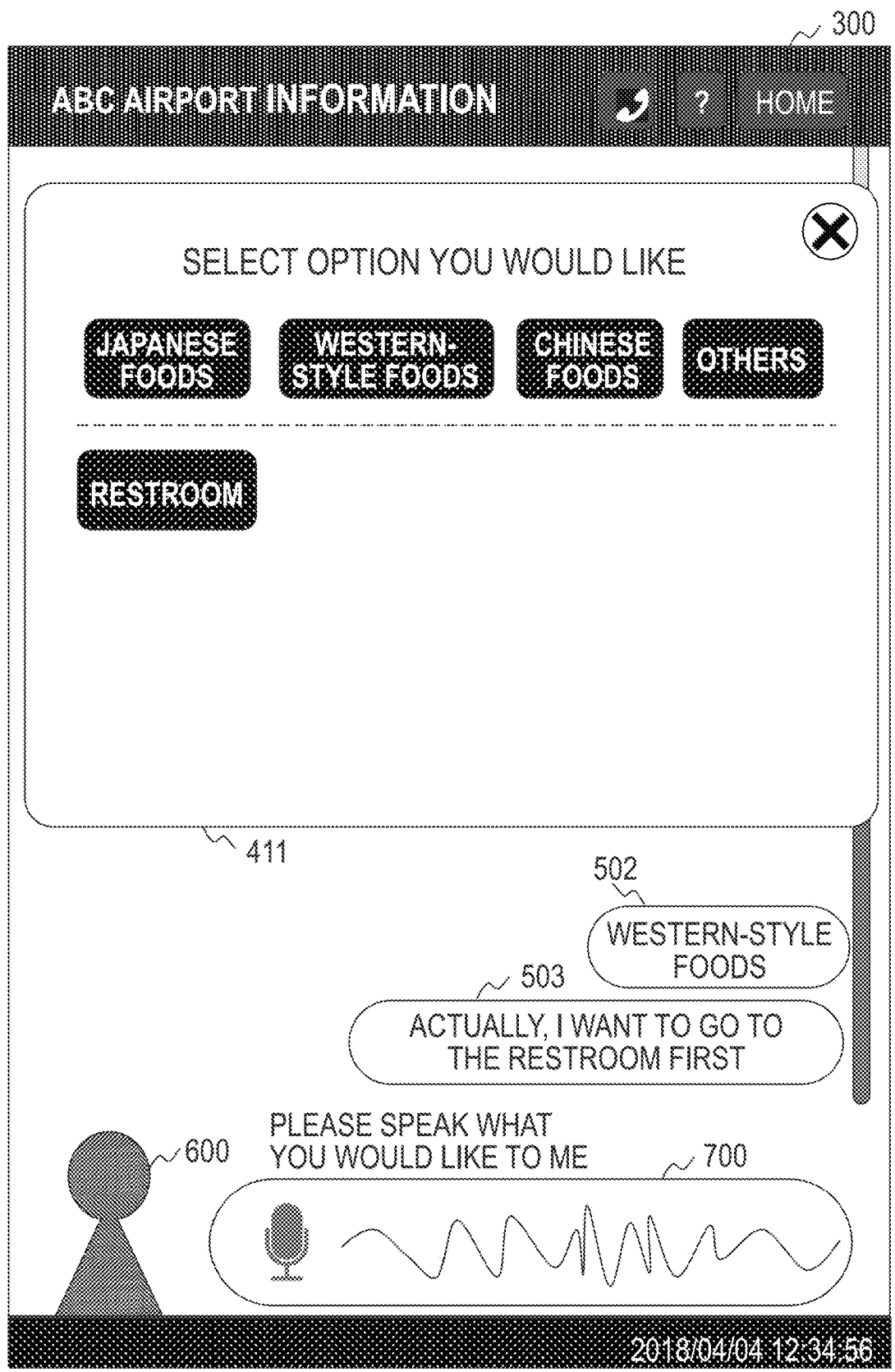
FIG. 7 is a diagram for illustrating another example of the guidance screen to be displayed on the touch panel display according to the embodiment of this invention.

FIG. 7 is a diagram for illustrating another example of the guidance screen 300 to be displayed on the touch panel display 40, and indicates a case in which a plurality of pieces of output data (options) are displayed in parallel when a plurality of inputs are obtained within a fixed period.

The control unit 10 outputs options 411 of "Japanese foods" to "Others" corresponding to the touch input (previous piece of input data) of "Western-style foods" (502) to the touch panel display 40, and then outputs an option of "Restrooms" corresponding to the current piece of input data being "Actually, I want to go to the restroom first" (503) in parallel. A window of the options 411 may be displayed as a pop-up.

In this case, the priority of the current piece of input data is higher than the priority of the previous piece of input data, and hence the control unit 10 can perform the output by adding the output data for the current piece of input data to the output data for the previous piece of input data.

The control unit 10 responds to both the previous piece of input data and the current piece of input data in parallel, to thereby be able to preferentially display the output data corresponding to the input data having a higher priority to handle the user's intention.

Figure 8:
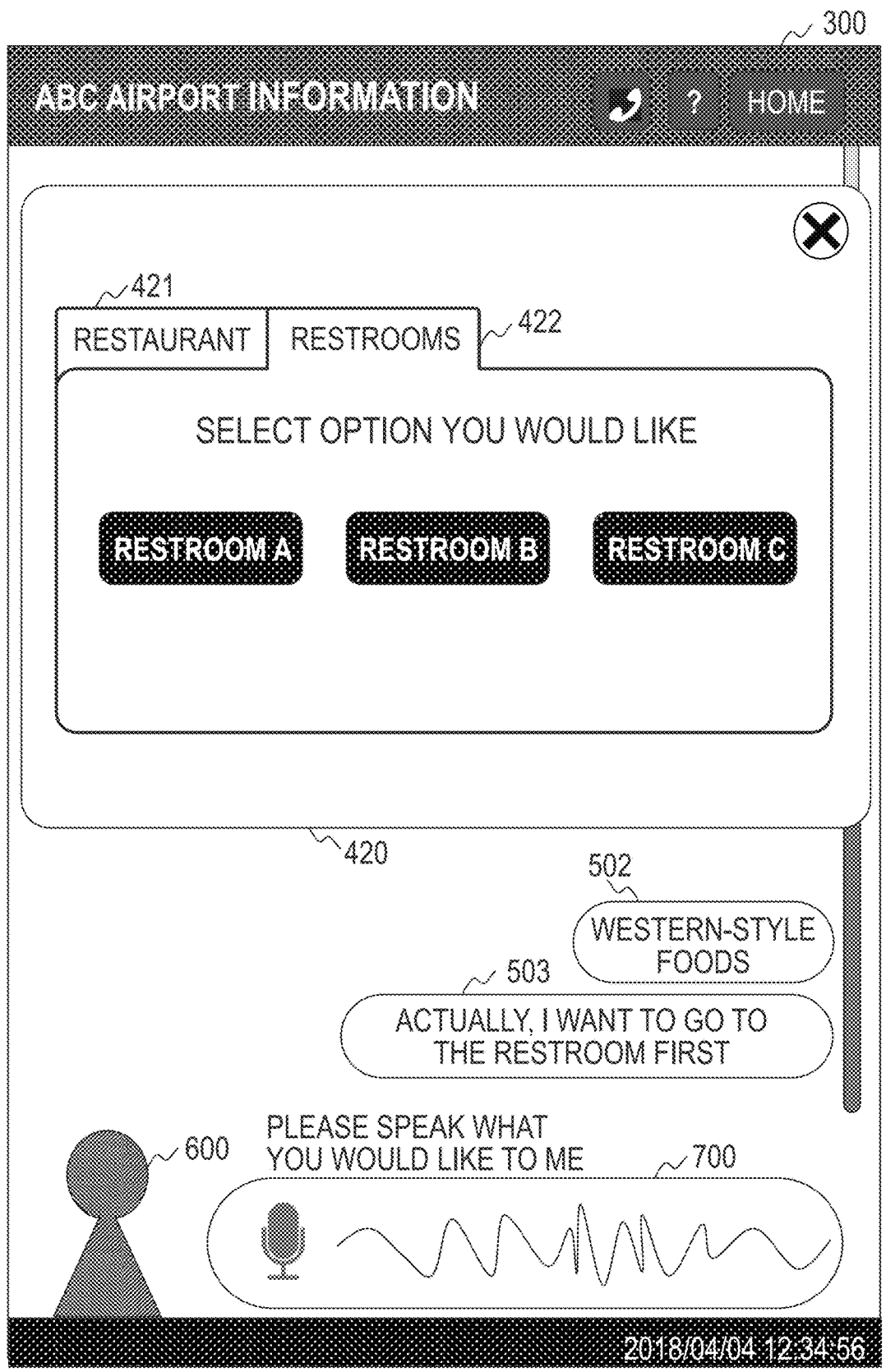
FIG. 8 is a diagram for illustrating another example of the guidance screen to be displayed on the touch panel display according to the embodiment of this invention.

FIG. 8 is a diagram for illustrating another example of the guidance screen 300 to be displayed on the touch panel display 40, and indicates a case in which a plurality of pieces of output data (options) are separately displayed in tabs.

The control unit 10 outputs, as options 420, a tab 421 of "Restaurants" corresponding to the touch input (immediately preceding piece of input data) of "WESTERN-STYLE FOODS" (502) and a tab 422 of "Restrooms" corresponding to the current piece of input data. A window of the options 420 may be displayed as a pop-up.

In this case, the priority of the current piece of input data is higher than the priority of the previous piece of input data, and hence the control unit 10 can perform the output by adding the output data (tab 421) for the current piece of input data to the output data (tab 421) for the previous piece of input data.

Then, the control unit 10 outputs the output data for the scenario corresponding to the piece of input data having a higher priority (tab 422) over the output data based on the scenario corresponding to the previous piece of input data (tab 421), to thereby allow the preferential display.

As described above, the output data corresponding to the input data having a higher priority is preferentially displayed, to thereby be able to handle the user's intention.

Figure 9:
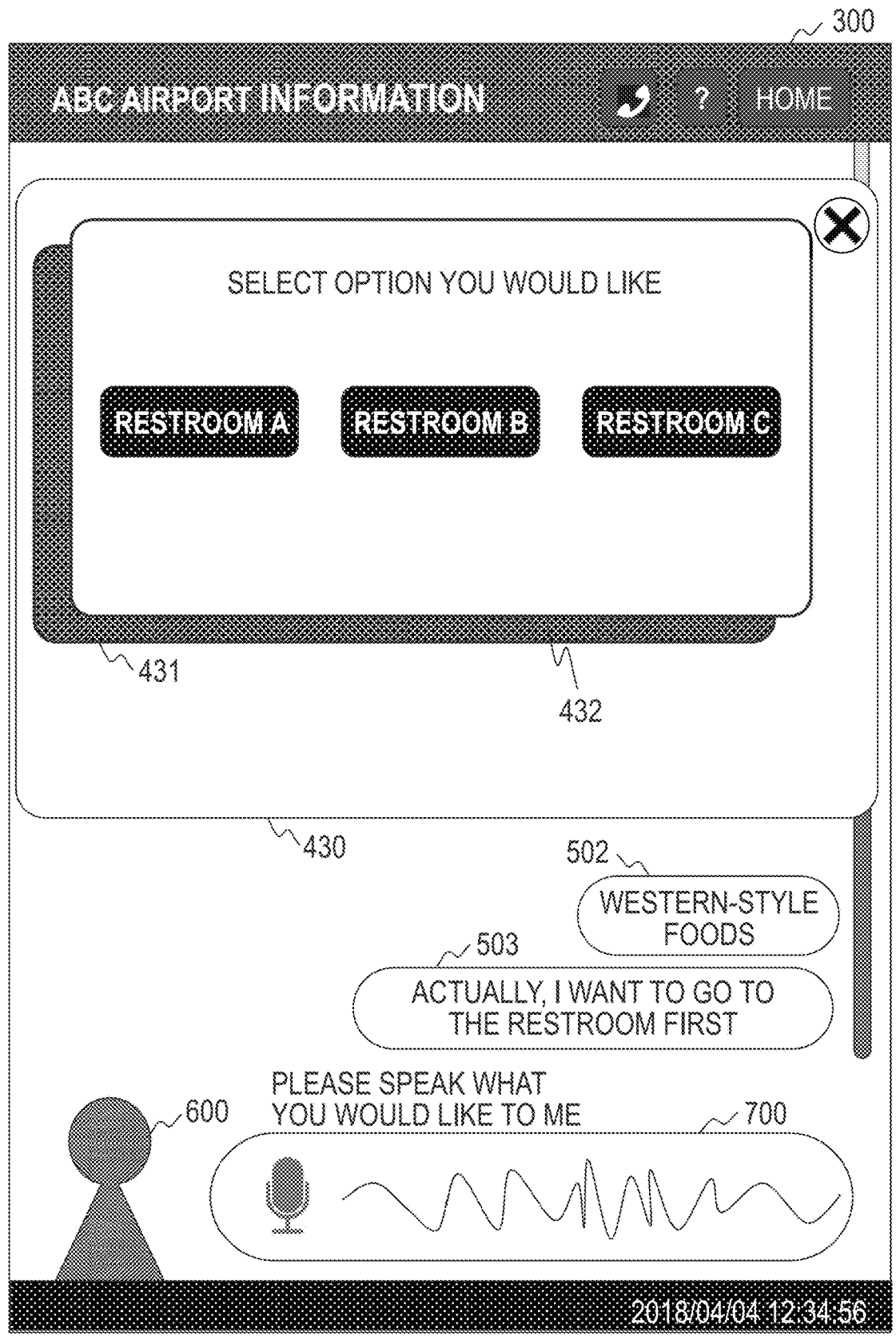
FIG. 9 is a diagram for illustrating another example of the guidance screen to be displayed on the touch panel display according to the embodiment of this invention.

FIG. 9 is a diagram for illustrating another example of the guidance screen 300 to be displayed on the touch panel display 40.

The priority of the current piece of input data is higher than the priority of the previous piece of input data, and hence the control unit 10 preferentially outputs the output data for the scenario corresponding to the current piece of input data over the output data for a scenario response corresponding to the previous piece of input data.

The control unit 10 displays a window of options 432 of "Restrooms" being the output data for the current piece of input data over options 431 of "Restaurants" being the output data for the previous piece of input data.

Therefore, the control unit 10 outputs the output data for the scenario corresponding to the piece of input data having a higher priority (options 432) over the output data based on the scenario corresponding to the previous piece of input data (options 431), to thereby allow the preferential display.

As described above, the output data corresponding to the input data having a higher priority is preferentially displayed, to thereby be able to handle the user's intention.

Figure 10:
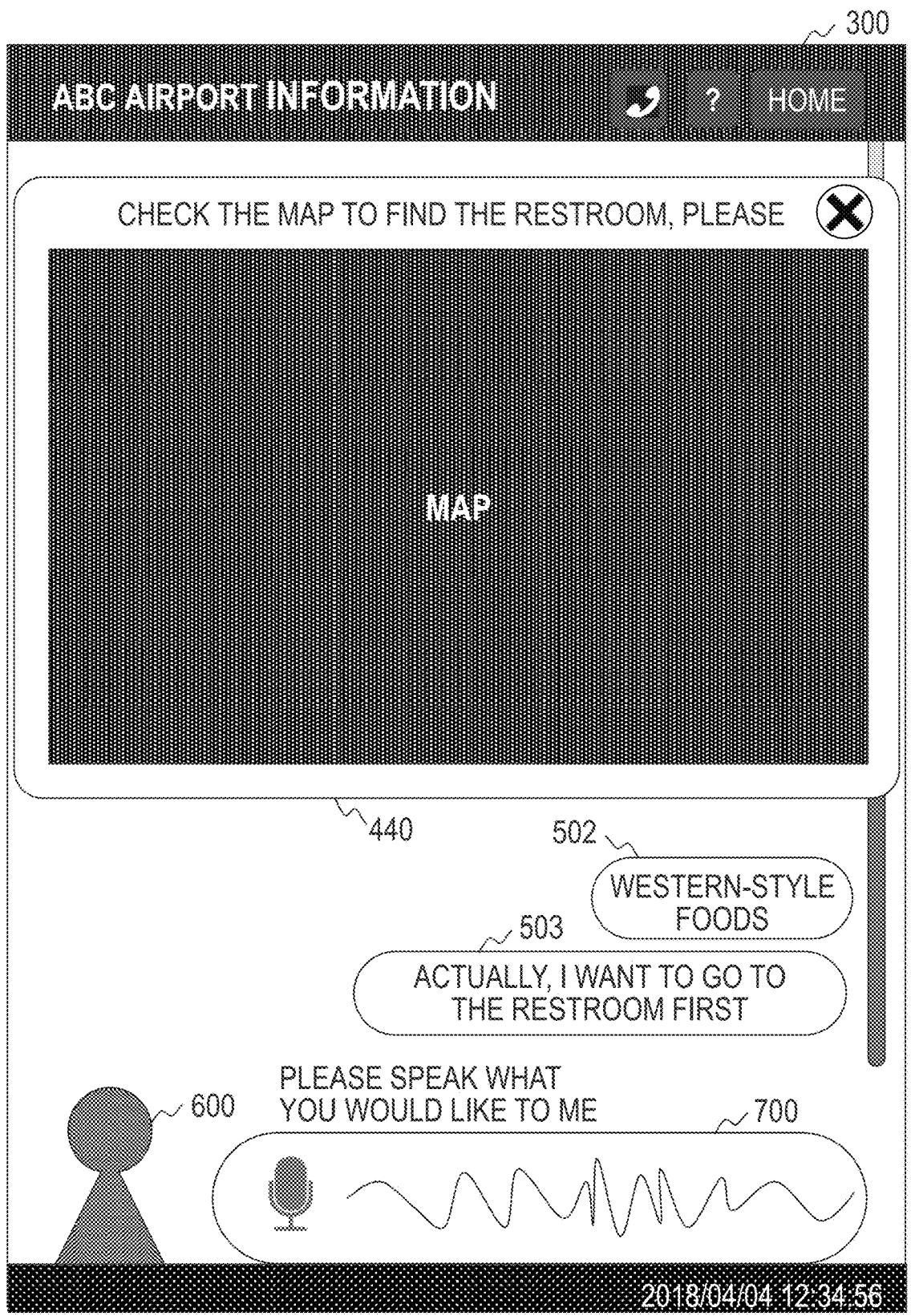
FIG. 10 is a diagram for illustrating another example of the guidance screen to be displayed on the touch panel display according to the embodiment of this invention. according to the embodiment of this invention.

In addition, when receiving the touch input or the audio input with respect to the options 432, as illustrated in FIG. 10, the control unit 10 obtains the map data on the selected restroom from the answer database 210, and outputs the map data to the touch panel 4.

The control unit 10 displays the output data based on the priorities of the previous piece of input data (touch input) and the current piece of input data (audio input), to thereby be able to handle the user's intention.

CONCLUSIONS

In the above-mentioned embodiment, when the user performs an input (mainly as a speech) in response to an option (for example, button) being displayed on the touch panel display 40 without selecting the option as a touch input, the control unit 10 may calculate the degree of relevance between the option and the input content, and change the scenario to be executed depending on the degree of relevance.

The control unit 10 may change rendering of the avatar 600 depending on the degree of relevance between the input data and the option being displayed. It is possible to perform predetermined display, for example, switch the display while the avatar 600 is making an agreeable response when the degree of relevance is high, or inhibit a change of the display while the avatar 600 looks confused when the degree of relevance is low. In another case, when the degree of relevance is low, the speech of the avatar 600 may be inhibited while displaying only the screen to receive the user's speech.

The above-mentioned embodiment is described by taking an example of using the touch panel 4 integrally formed of the touch sensor 41 serving as an input unit configured to receive a touch input and the touch panel display 40 serving as a display unit, but this invention is not limited thereto, and the display unit and the input unit may be provided as separate components.

This invention is not limited to the embodiments described above, and encompasses various modification examples. For instance, the embodiments are described in detail for easier understanding of this invention, and this invention is not limited to modes that have all of the described components.

Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A method of controlling a dialogue system, the dialogue system including a processor, a memory, an audio input apparatus, an audio output apparatus, and a display unit, the method comprising:
generating, by the processor, first input data and second input data by receiving audio input from the audio input apparatus and analyzing content of the audio input, wherein the second input data is received within a predetermined time period after the first input data;
determining, by the processor, a first scenario corresponding to the first input data and a second scenario corresponding to the second input data, the first scenario and the second scenario being selected from scenario information set in advance;
generating, by the processor, first output data designated by the first scenario and second output data designated by the second scenario;
calculating, by the processor, a priority of the first input data and a priority of the second input data;

determining, by the processor, presence of the first output data being prepared to be output before the second output data;
determining whether the priority of the first input data is higher or lower than the priority of the second input data;
setting, by the processor, a first output method for the first output data designated by the first scenario and the second output data designated by the second scenario based on the priority of the first input data being higher than the priority of the second input data when the first output data being prepared to be output is determined to be present; and
changing, by the processor, to a second output method for the first output data designated by the first scenario and the second output data designated by the second scenario based on the priority of the first input data being lower than the priority of the second input data when the first output data being prepared to be output is determined to be present,
wherein the calculating of the priority of the second input data is based, at least in part, on a degree of relevance using a comparison of words between the second input data and the first output data being prepared to be output before the second output data, and
wherein the calculating of the priority of the second input data is based, at least in part, on a usage situation, said usage situation being analyzed based on one or more sensor inputs selected from the group consisting of: a camera input, a microphone input, and a proximity sensor input.

2. The method of controlling a dialogue system according to claim 1, wherein, according to the first control method, the first output data is displayed before the second output data is displayed.

3. The method of controlling a dialogue system according to claim 1, wherein, according to the second control method, the second output data is displayed before the first output data is displayed.

4. The method of controlling a dialogue system according to claim 1, wherein, according to the first control method and the second control method, a size and position of the first output data and the second output data are controlled to be different based on the determined priority of the first input data and the second input data.

5. The method of controlling a dialogue system according to claim 1,
wherein the display unit comprises a touch panel configured to receive a touch input.

6. A dialogue system, which includes a processor, a memory, an audio input apparatus, an audio output apparatus, and a display unit, the dialogue system comprising:
an input data generation module configured to generate first input data and second input data by receiving audio input from the audio input apparatus and analyzing content of the audio input, wherein the second input data is received within a predetermined time period after the first input data;
an output module configured to generate first output data designated by a first scenario corresponding to the first input data and to generate second output data designated by a second scenario corresponding to the second input data, the first scenario and the second scenario being selected from scenario information set in advance;
a priority calculation module configured to calculate a priority of the first input data and the second input data; and
a scenario control module configured to:
determine presence of the first output data being prepared to be output before the second output data,
determine whether the priority of the first input data is higher or lower than the priority of the second input data,
set a first output method for the first output data designated by the first scenario and the second output data designated by the second scenario based on the priority of the first input data being higher than the priority of the second input data when the first output data being prepared to be output is determined to be present, and
change to a second output method for the first output data designated by the first scenario and the second output data designated by the second scenario based on the priority of the first input data being lower than the priority of the second input data when the first output data being prepared to be output is determined to be present,
wherein the calculating of the priority of the second input data is based, at least in part, on a degree of relevance using a comparison of words between the second input data and the first output data being prepared to be output before the second output data, and
wherein the calculating of the priority of the second input data is based, at least in part, on a usage situation, said usage situation being analyzed based on one or more sensor inputs selected from the group consisting of: a camera input, a microphone input, and a proximity sensor input.

7. The dialogue system according to claim 6, wherein, according to the second control method, the second output data is displayed before the first output data is displayed.

8. The dialogue system according to claim 6, wherein, according to the second control method, the second output data is displayed before the first output data is displayed.

9. The dialogue system according to claim 6, wherein, according to the first control method and the second control method, a size and position of the first output data and the second output data are controlled to be different based on the determined priority of the first input data and the second input data.

10. The dialogue system according to claim 6,
wherein the display unit comprises a touch panel configured to receive a touch input.

11. A computer-readable non-transitory data storage medium, containing a program for causing a computer to execute a dialogue, the computer including a processor, a memory, an audio input apparatus, an audio output apparatus, and a display unit, the program causing the computer to execute:
generating first input data and second input data by receiving audio input from the audio input apparatus and analyzing content of the audio input, wherein the second input data is received within a predetermined time period after the first input data;
determining a first scenario corresponding to the first input data and a second scenario corresponding to the second input data, the first scenario and the second scenario being selected from scenario information set in advance;
generating first output data designated by the first scenario and second output data designated by the second scenario;

calculating a priority of the first input data and a priority of the second input data;

determining presence of the first output data being prepared to be output before the second output data;

determining whether the priority of the first input data is higher or lower than the priority of the second input data;

setting, by the processor, a first output method for the first output data designated by the first scenario and the second output data designated by the second scenario based on the priority of the first input data being higher than the priority of the second input data when the first output data being prepared to be output is determined to be present; and changing to a second output method for the first output data designated by the first scenario and the second output data designated by the first scenario based on the priority of the first input data being lower than the priority of the second input data when the first output data being prepared to be output is determined to be present, wherein the calculating of the priority of the second input data is based, at least in part, on a degree of relevance using a comparison of words between the second input data and the first output data being prepared to be output before the second output data, and wherein the calculating of the priority of the second input data is based, at least in part, on a usage situation, said usage situation being analyzed based on one or more sensor inputs selected from the group consisting of: a camera input, a microphone input, and a proximity sensor input.

* * * * *